US012646864B2

(12) United States Patent
Ito

(10) Patent No.: US 12,646,864 B2
(45) Date of Patent: Jun. 2, 2026

(54) CRIMP TERMINAL AND TERMINAL-FITTED ELECTRIC WIRE

(71) Applicant: YAZAKI CORPORATION, Tokyo (JP)

(72) Inventor: Naoki Ito, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 281 days.

(21) Appl. No.: 18/503,042

(22) Filed: Nov. 6, 2023

(65) Prior Publication Data

US 2024/0178583 A1 May 30, 2024

(30) Foreign Application Priority Data

Nov. 29, 2022 (JP) ................................ 2022-190170

(51) Int. Cl.
*H01R 4/18* (2006.01)

(52) U.S. Cl.
CPC ............... *H01R 4/185* (2013.01); *H01R 4/18* (2013.01); *H01R 4/184* (2013.01)

(58) Field of Classification Search
CPC ......... H01R 4/184; H01R 4/185; H01R 4/188
USPC .................................................. 439/877, 878
See application file for complete search history.

(56) References Cited

U.S. PATENT DOCUMENTS 6,004,171 A * 12/1999 Ito .......................... H01R 4/184 439/877
7,828,611 B2 * 11/2010 Nakamura ............. H01R 4/185 439/877
9,039,466 B2 * 5/2015 Lio ........................ H01R 4/182 439/877
9,905,941 B2 * 2/2018 Tago ...................... H01R 4/185
10,148,028 B1 * 12/2018 Yamamoto ........... H01R 13/052
10,355,373 B2 * 7/2019 Iwasawa .................. H01R 4/70
10,601,207 B2 * 3/2020 Takayanagi ............ H02G 1/145
10,923,866 B2 * 2/2021 Sato .......................... H01R 4/20
10,923,871 B2 * 2/2021 Okuda ............... H01R 43/0488
2011/0177728 A1 * 7/2011 Uchiyama ............ H01R 43/048 29/874
2014/0311799 A1 10/2014 Kawamura et al.
2017/0201033 A1 * 7/2017 Shimizu ............... H01R 13/405
2021/0104825 A1 * 4/2021 Kawai .................... H01R 4/185
(Continued)

FOREIGN PATENT DOCUMENTS

JP 5720527 B2 5/2015
JP 2015-153717 A 8/2015

*Primary Examiner* — Marcus E Harcum
(74) *Attorney, Agent, or Firm* — KENEALY VAIDYA LLP

(57) ABSTRACT

A crimp terminal includes a core wire crimping portion, an electrical connection portion, and a coupling portion, in which the coupling portion has a bottom wall portion and side wall portions, the side wall portions have straight portions extending from the core wire crimping portion along a longitudinal direction and wide portions connecting between the straight portions and the electrical connection portion, respectively, each of the straight portions extends in a straight line along each of the side walls of the core wire crimping portion, and in a width direction, a distance between the wide portions facing each other is formed so that the distance is gradually wider from the straight portion side toward the electrical connection portion side.

2 Claims, 5 Drawing Sheets

(56) References Cited

U.S. PATENT DOCUMENTS

| | | | | |
|---|---|---|---|---|
| 2021/0296793 | A1* | 9/2021 | Onuma ................ | H01B 7/2806 |
| 2022/0069482 | A1 | 3/2022 | Randolph et al. | |

* cited by examiner

CRIMP TERMINAL AND TERMINAL-FITTED ELECTRIC WIRE

CROSS-REFERENCE TO RELATED APPLICATION (S)

The present application claims priority to and incorporates by reference the entire contents of Japanese Patent Application No. 2022-190170 filed in Japan on Nov. 29, 2022.

BACKGROUND OF THE INVENTION

1. Field of the Invention

The present invention relates to a crimp terminal and a terminal-fitted electric wire.

2. Description of the Related Art

In the related art, there is a terminal-fitted electric wire whose core wire of the electric wire is wrapped and crimped by two side walls of a crimp terminal. For example, in Japanese Patent No. 5720527, disclosed is a technology for producing a terminal-fitted electric wire by a terminal-crimping device, the technology including an upper die that sandwiches a part of a crimping portion (core wire crimping portion) between a lower die surface and an upper die surface and allows the part of the crimping portion to be crimped to an exposed core wire portion by being moved toward the lower die; and a terminal pressing member with a flat surface that presses an end part of the crimping portion protruding from the upper die surface from above by being moved toward the lower die. According to Japanese Patent No. 5720527, the protruding width of a protruding portion formed on the terminal when the terminal is crimped to the exposed core wire part of the end part of an electric wire can be made as small as possible.

However, in a case in which the terminal pressing member with the flat surface as described in Japanese Patent No. 5720527 presses the end part of the crimping portion from above, sometimes variation in the shape of the end part of the crimping portion occurred. In addition, in a case of employing a configuration in which the upper die is extended to the end part of the crimping portion, and the upper die surface of the upper die presses the end part of the crimping portion, the side walls of the upper die may interfere with a coupling portion via which an electrical connecting portion to be connected to a mating member and the crimping portion are coupled, resulting in variation in the shape of the terminal after crimping.

SUMMARY OF THE INVENTION

The present invention has been made in view of the above circumstances, and an object of the present invention is to provide a crimp terminal and a terminal-fitted electric wire that is able to prevent a variation in a terminal shape while preventing a terminal height at a front end of a core crimping portion from increasing during the terminal crimping.

In order to achieve the above mentioned object, a crimp terminal according to one aspect of the present invention includes a core wire crimping portion that is crimped to a core wire exposed from an end of a covering portion of an electric wire; an electrical connection portion that is able to be connected to a mating-side member; and a coupling portion that is provided between the core wire crimping portion and the electrical connection portion, wherein the coupling portion includes a bottom wall portion and side wall portions that are provided to stand at both ends of the bottom wall portion respectively in a width direction orthogonal to a longitudinal direction from the core wire crimping portion toward the electrical connection portion, each of the side wall portions has a straight portion that extends from the core wire crimping portion along the longitudinal direction and a wide portion that connects between the straight portion and the electrical connection portion, the core wire crimping portion includes a bottom wall and side walls that are provided to stand at both ends of the bottom wall respectively in the width direction, each of the straight portions extends in a straight line along each of the side walls of the core wire crimping portion, and in the width direction, a distance between the wide portions facing each other is formed so that the distance is gradually wider from the straight portion side toward the electrical connection portion side.

In order to achieve the above mentioned object, a terminal-fitted electric wire according to another aspect of the present invention includes an electric wire that is formed of a conductive core wire covered by an insulative covering portion; and a crimp terminal that includes a core wire crimping portion wrapping and crimping an entire circumference of the core wire exposed from the end of the covering portion, an electrical connection portion provided on an opposite side to the covering portion side with respect to the core wire crimping portion and connected to a mating-side member, and a coupling portion provided between the core wire crimping portion and the electrical connection portion, wherein a height of the terminal at a first end portion on the coupling portion side in the core wire crimping portion is lower than a height of the terminal at a second end portion on the covering portion side in the core wire crimping portion, the coupling portion includes a bottom wall portion and side wall portions that are provided to stand at both ends of the bottom wall portion respectively in a width direction of the crimp terminal, each of the side wall portions has a straight portion that extends from the core wire crimping portion toward the longitudinal direction of the crimp terminal and a wide portion that connects between the straight portion and the electrical connection portion, each of the straight portions extends in a straight line along each of the side walls of the core wire crimping portion, and in the width direction of the crimp terminal, a distance between the wide portions facing each other is formed so that the distance is gradually wider from the straight portion side toward the electrical connection portion side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinbelow, the details of a crimp terminal and a terminal-fitted electric wire according to an embodiment of the present invention will be described with reference to the drawings. The present invention is not limited by this embodiment. The components in the following embodiment include those that can be readily conceived by those skilled in the art or are substantially the same.

Embodiment

Figure 1:
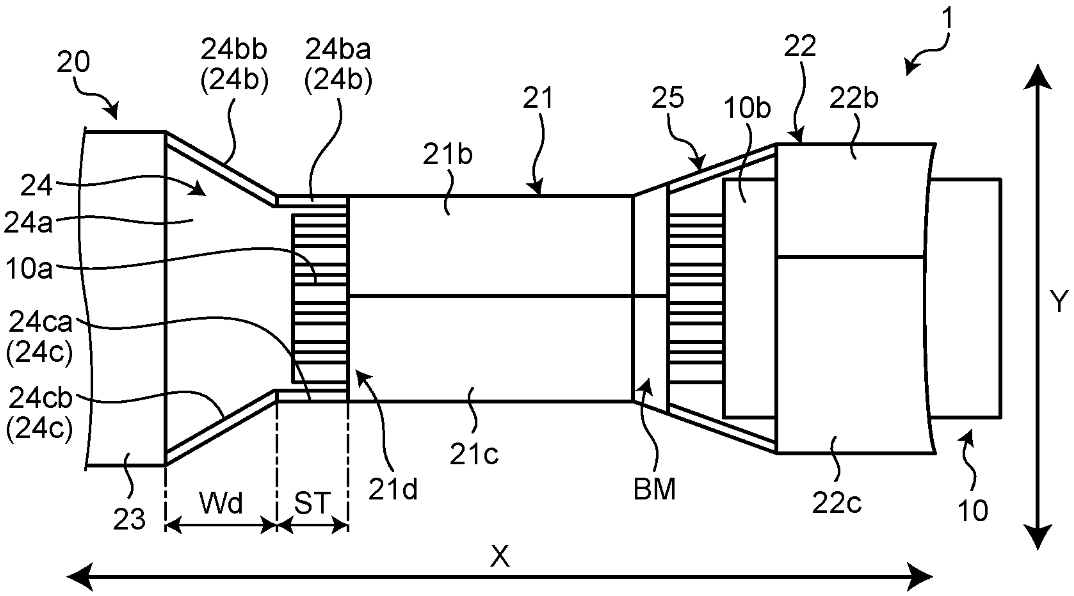
FIG. 1 is a top view illustrating a terminal-fitted electric wire according to an embodiment.
Figure 2:
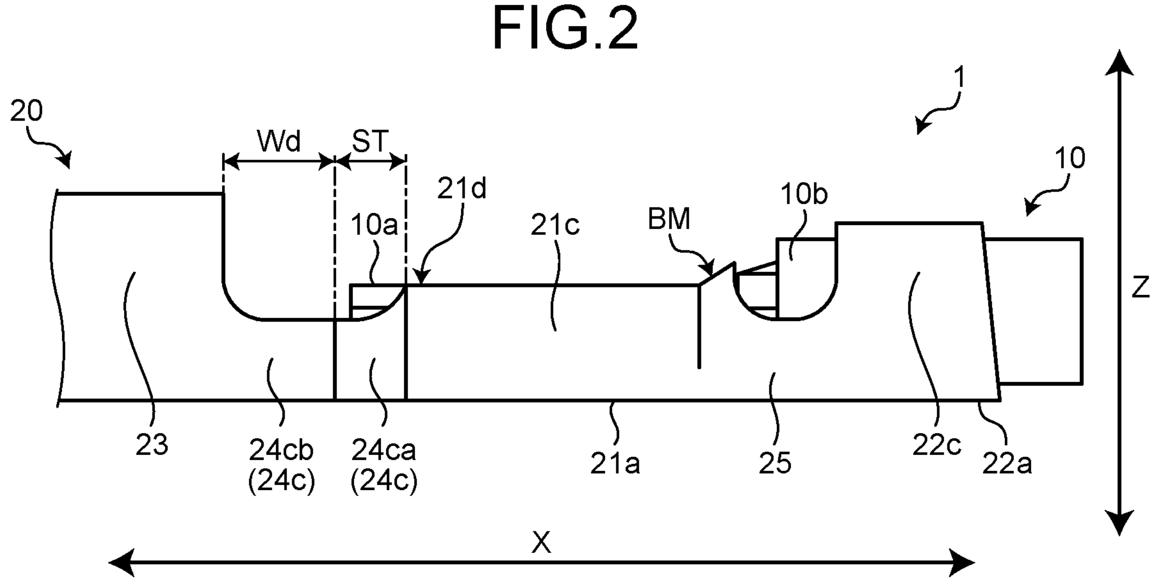
FIG. 2 is a side view illustrating the terminal-fitted electric wire according to the embodiment.
Figure 3:
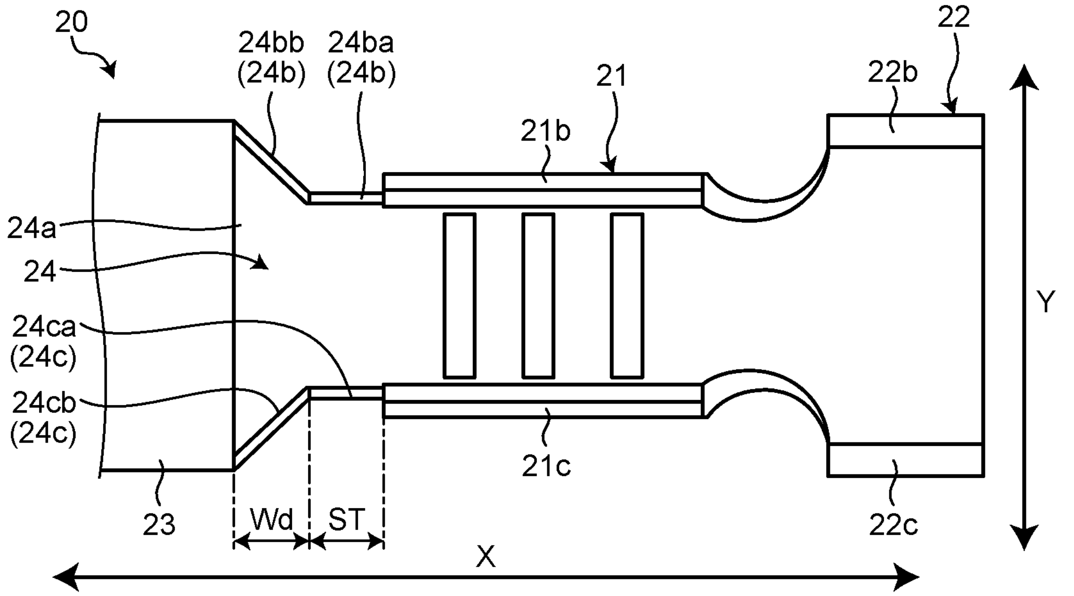
FIG. 3 is a top view illustrating a crimp terminal according to the embodiment.
Figure 4:
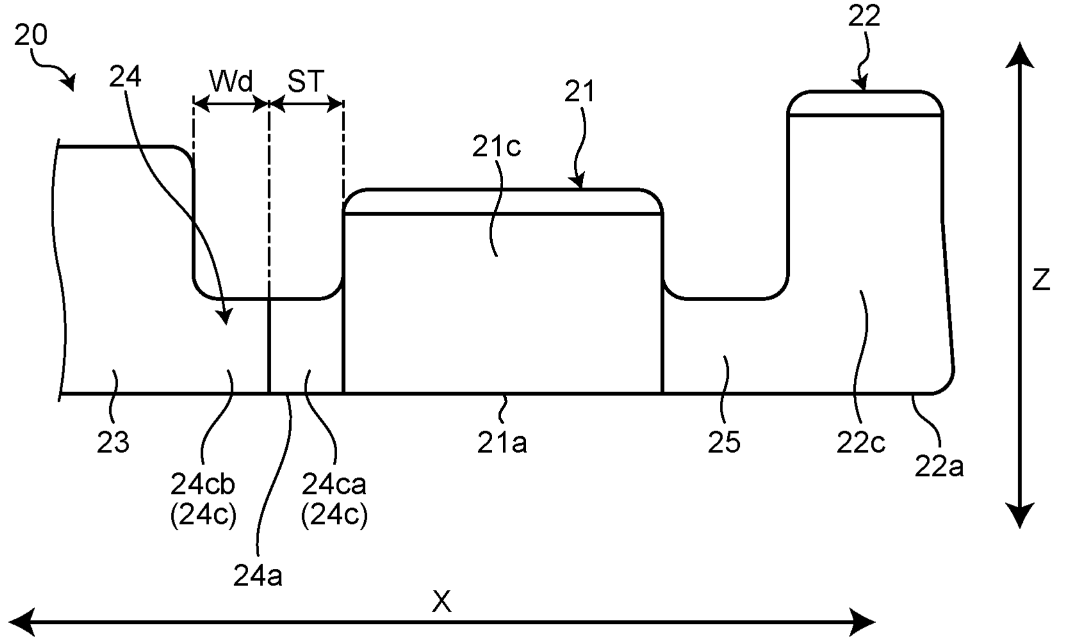
FIG. 4 is a side view illustrating the crimp terminal according to the embodiment.
Figure 5:
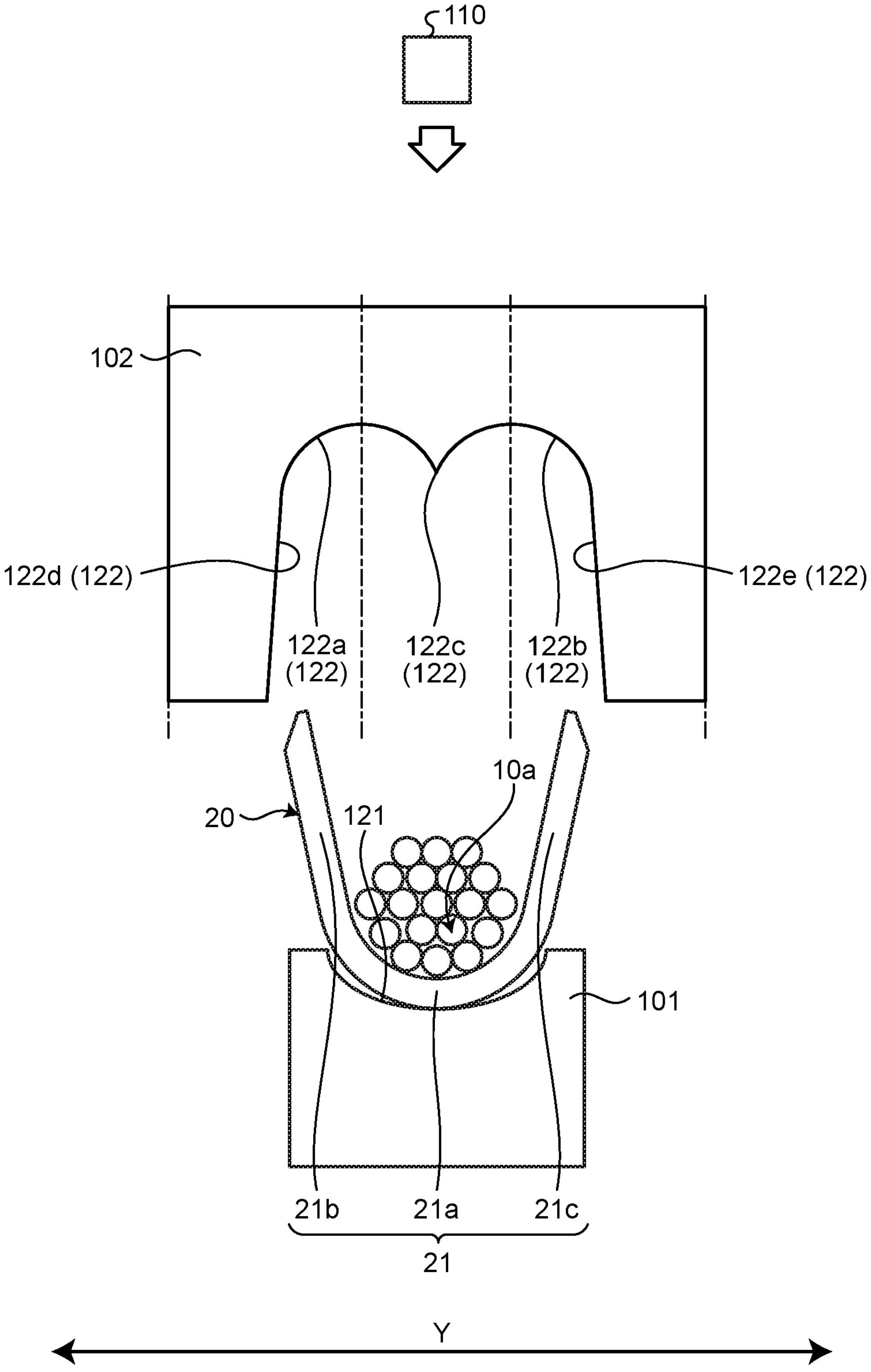
FIG. 5 is a front view illustrating crimping of the crimp terminal performed by a terminal-crimping device according to the embodiment.
Figure 6:
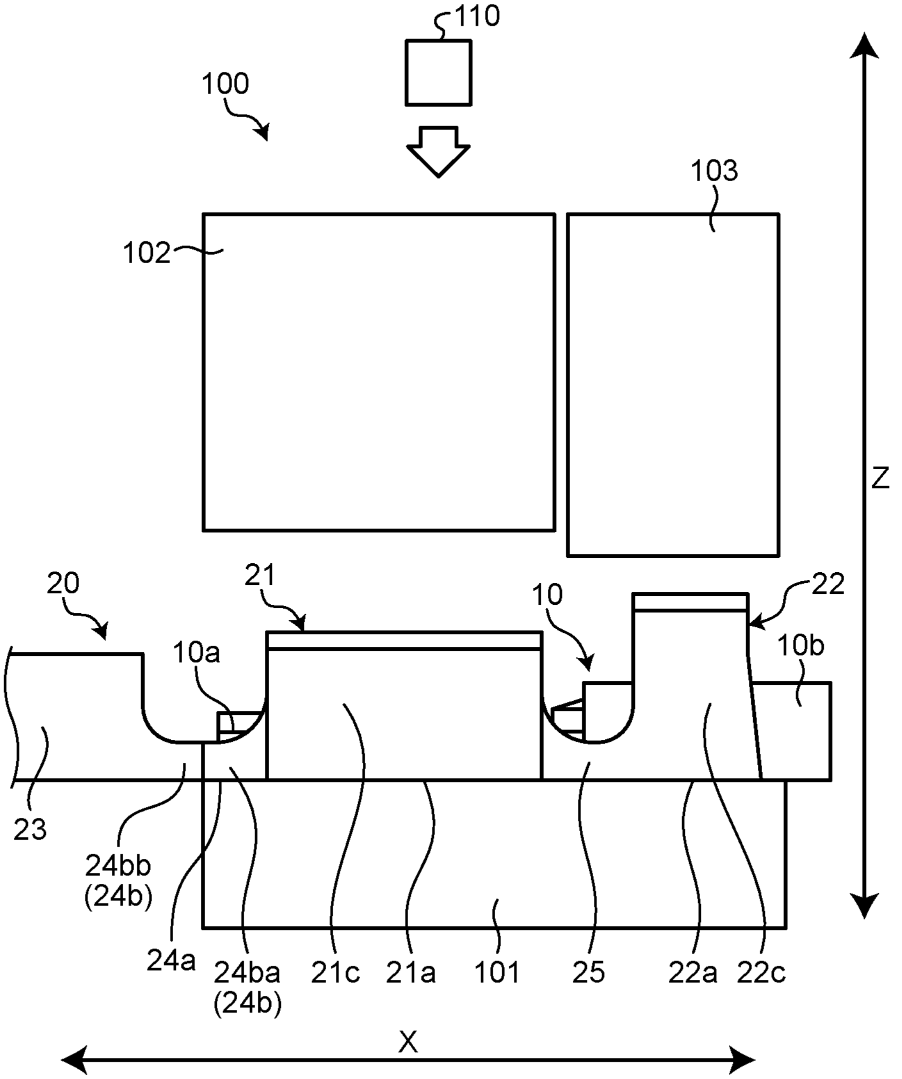
FIG. 6 is a side view illustrating crimping of the crimp terminal performed by the terminal-crimping device according to the embodiment.
Figure 7:
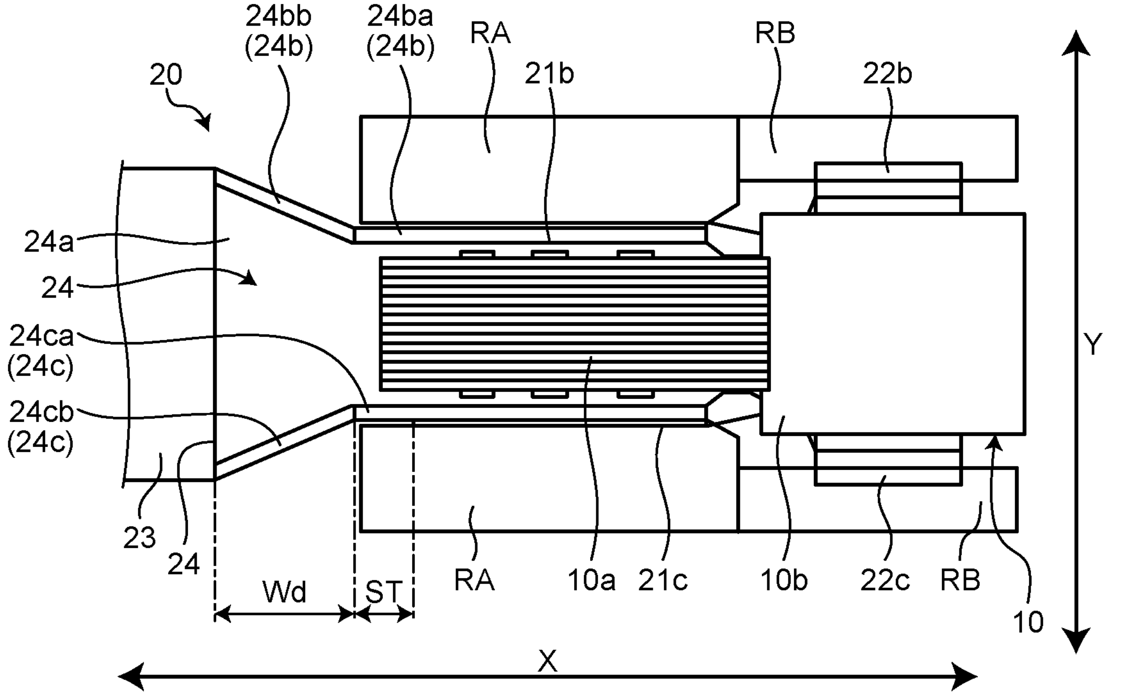
FIG. 7 is a top view illustrating a relationship between the crimp terminal and an upper die according to the embodiment.

An embodiment will be described with reference to FIG. 1 to FIG. 7. The present embodiment relates to a terminal-fitted electric wire. FIG. 1 is a top view illustrating the terminal-fitted electric wire according to the embodiment; FIG. 2 is a side view illustrating the terminal-fitted electric wire according to the embodiment; FIG. 3 is a top view illustrating a crimp terminal according to the embodiment; FIG. 4 is a side view illustrating the crimp terminal according to the embodiment; FIG. 5 is a front view illustrating crimping of the crimp terminal performed by a terminal-crimping device according to the embodiment; FIG. 6 is a side view illustrating crimping of the crimp terminal performed by the terminal-crimping device according to the embodiment; and FIG. 7 is a top view illustrating a relationship between the crimp terminal and an upper die according to the embodiment.

In the following description, among a first direction, a second direction, and a third direction, which intersect one another, the first direction is referred to as a "longitudinal direction X", the second direction is referred to as a "width direction Y", and the third direction is referred to as a "height direction Z". Here, the longitudinal direction X, the width direction Y, and the height direction Z are substantially orthogonal to one another. In the embodiment, the longitudinal direction X typically corresponds to a longitudinal direction of the crimp terminal crimped to an electric wire, an extension direction where the electric wire extends, an insertion and removal direction between the crimp terminal and a mating terminal, and other directions. The width direction Y and the height direction Z correspond to a cross direction that intersects the longitudinal direction X. The height direction Z typically corresponds to a board thickness direction of the bottom portion of the crimp terminal and a height direction of the crimp terminal after crimping.

As illustrated in FIG. 1, a terminal-fitted electric wire 1 according to the embodiment is applied to wire harnesses and the like used in vehicles. Here, a wiring harness is used for the connection between individual devices mounted in a vehicle, and serves as a collective component formed of a plurality of electric wires 10 used for power supply and signal communication, for example. The wiring harness is configured to connect the electric wires 10 to each device by a connector and the like.

The terminal-fitted electric wire 1 according to the embodiment includes an electric wire 10 and a crimp terminal 20. The electric wire 10 includes core wires 10*a* serving as a conductive linear conductor, and an insulative covering portion 10*b* that covers the core wires 10*a*. The core wires 10*a* are a plurality of conductive metal strands bundled together. The covering portion 10*b* is a wire covering that covers an outer circumference of the core wires 10*a*. The covering portion 10*b* is formed by, for example, extrusion molding of an insulating resin material and the like (PP, PVC, cross-linked PE, and the like. The material is selected appropriately in consideration of abrasion resistance, chemical resistance, heat resistance, and the like). At an end portion of the electric wire 10, the covering portion 10*b* is stripped away, so that a part of the core wires 10*a* is exposed.

The crimp terminal 20 is a terminal fitting to which the electric wire 10 is electrically connected and connected to a conductive mating-side member. The mating-side member is, for example, a mating terminal provided on a connection target. The crimp terminal 20 includes a core wire crimping portion 21, a covering crimping portion 22, an electrical connection portion 23, a coupling portion 24, and an intermediate portion 25. The core wire crimping portion 21, the covering crimping portion 22, the electrical connection portion 23, the coupling portion 24, and the intermediate portion 25 are formed as a whole by conductive metal materials. The crimp terminal 20 is interconnected to the electrical connection portion 23, the coupling portion 24, the core wire crimping portion 21, the intermediate portion 25, and the covering crimping portion 22 in this order along the longitudinal direction X from one side to the other side.

The core wire crimping portion 21 is a part that is crimped to the exposed core wires 10*a* at the end of the electric wire 10. As illustrated in FIGS. 1 and 2, the core wire crimping portion 21 includes a bottom wall 21*a*, a first barrel piece 21*b*, and a second barrel piece 21*c*. The bottom wall 21*a* is a bottom wall of the core wire crimping portion 21 and is supported by a first die 101 of a terminal-crimping device 100 described later. As illustrated in FIGS. 3 and 4, in the crimp terminal 20 before swage crimp, the first barrel piece 21*b* is formed as a side wall protruding from one end of the bottom wall 21*a* in the width direction Y. In addition, the second barrel piece 21*c* is formed as a side wall protruding from the other end of the bottom wall 21*a* in the width direction Y. In the crimp terminal 20 before swage crimp, the first barrel piece 21*b* and the second barrel piece 21*c* are arranged so that inner walls thereof face each other. In other words, before the swage crimp, the core wire crimping portion 21 includes the bottom wall 21*a* and side walls (first barrel piece 21*b* and second barrel piece 21*c*) that are provided to stand at both ends of the bottom wall 21*a* respectively in the width direction Y and formed in a U-shape.

The first barrel piece 21*b* and the second barrel piece 21*c* are wrapped around and swage-crimped to the core wires 10*a*, which are placed in a space surrounded by the bottom wall 21*a*, the first barrel piece 21*b*, and the second barrel piece 21*c* individually to form a B-shaped cross section in the longitudinal direction X. In other words, the core wire crimping portion 21 after the swage crimping is in a state in which the swage crimp, so-called B crimp, is performed on the core wires 10*a*. After the swage crimping, the first barrel piece 21*b* and the second barrel piece 21*c* are bent into a curved shape with respective free ends thereof to face an inner wall of the bottom wall 21*a*, thereby outer wall surfaces on the respective free end sides abutting against each other. In the crimp terminal 20 after the swage crimping, the first barrel piece 21*b* and the second barrel piece 21*c* each constitute a side wall and an upper wall of the core wire crimping portion 21. The respective free ends of the first barrel piece 21*b* and the second barrel piece 21*c* are bitten into the core wires 10*a*.

As illustrated in FIG. 2, in the crimp terminal 20 after the swage crimping, a terminal height of a first end portion 21*d* (front end) of the core wire crimping portion 21 on the coupling portion 24 side is lower than a terminal height of a second end portion BM (rear end) of the core wire crimping portion 21 on the covering portion 10*b* side. In the embodiment, a so-called bell-mouth is formed at the second end portion BM of the core wire crimping portion 21 on the covering portion 10*b* side. The bell-mouth is a part produced such that the end portions of the first barrel piece 21*b* and the second barrel piece 21*c* are less pressurized than the center portions of the first barrel piece 21*b* and the second barrel piece 21*c* in the longitudinal direction X in a case in which the core wire crimping portion 21 of the crimp terminal 20 is swaged. In other words, the bell-mouth of the second end portion BM is a portion protruding toward the opposite side to the core wire 10*a* side on which the first barrel piece 21*b* and the second barrel piece 21*c* are crimped to the core wires 10*a*. The second end portion BM is formed as a part widened along the longitudinal direction X such that the part is gradually separated from the core wires 10*a* as the part extends from the center of the core wire crimping portion 21 to an end of the covering crimping portion 22 side in the longitudinal direction X. In other words, the second end portion BM is widened obliquely outward to be away from the outer circumference of the core wires 10*a* as the second end portion BM extends from the center of the core wire crimping portion 21 to the end of the covering crimping portion 22 in the longitudinal direction X.

Here, in a case in which the core wires 10*a* are wrapped and swaged by the first barrel piece 21*b* and the second barrel piece 21*c* with the bottom wall 21*a*, the bell-mouth of the second end portion BM is formed to prevent the core wires 10*a* from being damaged by corner edges (edges) on the inner surface side of the end portions of the first barrel piece 21*b* and the second barrel piece 21*c*.

On the other hand, in the embodiment, the bell-mouth is not formed on the first end portion 21*d*, and the first end portion 21*d* is formed along the longitudinal direction X and has a substantially constant height from the center of the core wire crimping portion 21 toward the electrical connection portion 23 in the longitudinal direction X. The bell-mouth may be formed on the first end portion 21*d*. In this case, a height of the bell-mouth of the first end portion 21*d* in the height direction Z is formed lower than a height of the second end portion BM in the height direction Z.

For example, the bell-mouth on the first end portion of the core wire crimping portion may interfere with a lance for engaging a terminal or the like provided on a connector of a mating member, thereby interrupting the terminals to be completely mated with each other. In the embodiment, as no formation of the bell-mouth on the first end portion 21*d* (or the formation of a smaller bell mouth), it is possible to prevent the interruption of the terminals to be completely mated with each other caused by the interference between the crimp terminal 20 and the mating member.

The covering crimping portion 22 is a part that is crimped to the covering portion 10*b* of the electric wire 10. As illustrated in FIGS. 1 and 2, the covering crimping portion 22 includes a bottom wall portion 22*a*, a third barrel piece 22*b*, and a fourth barrel piece 22*c*, as similarly to the core wire crimping portion 21. The covering crimping portion 22 is formed in a U-shape with the bottom wall 21*a* as a bottom wall. The third barrel piece 22*b* and the fourth barrel piece 22*c* each are wrapped around and swage-crimped to the covering portion 10*b*, which is placed in a space surrounded by the bottom wall portion 22*a*, the third barrel piece 22*b*, and the fourth barrel piece 22*c* to form a cross-section in the longitudinal direction into an elliptical shape. In other words, the core wire crimping portion 21 after the swage crimping is in a state in which the swage crimp, so called overlap crimp, is performed on the covering portion 10*b*.

The covering crimping portion 22 is coupled to the covering crimping portion 21 by the intermediate portion 25. The crimp terminal 20 is formed as a so-called separate barrel-type crimp terminal in which the first and second barrel pieces 21*b* and 21*c*, and the third and fourth barrel pieces 22*b* and 22*c* are separated via the intermediate portion 25. In other words, the intermediate portion 25 is formed in a U-shape in cross-section in the longitudinal direction, and a part of the bottom wall and side walls of the core wire crimping portion 21, and a part of the bottom wall and side walls of the covering crimping portion 22 are coupled via the intermediate portion 25.

The electrical connection portion 23 is a part that is connected to the mating-side member. The electrical connection portion 23 may be in the form of a male-type terminal or may be in the form of a female-type terminal. The electrical connection portion 23 of the embodiment is illustrated as the form of a male-type terminal and is electrically connected to a mating-side terminal having the form of a female-type terminal provided on the mating-side member. The electrical connection portion 23 is not limited to the mating terminal, and may be configured to be electrically connected to various conductive members such as grounding members. In this case, the electrical connection portion 23 may be in the form of a so-called round-type terminal (LA terminal) that is fastened to a grounding member, for example.

The coupling portion 24 is a part via which the electrical connection portion 23 and the core wire crimping portion 21 are coupled in the crimp terminal 20. The coupling portion 24 includes a bottom wall portion 24*a* and side wall portions 24*b* and 24*c* that are provided to stand at both ends of the bottom wall portion 24*a* of the crimp terminal 20 respectively in the width direction Y. The side wall portions 24*b* and 24*c* face each other in the width direction Y of the crimp terminal 20. A width of the electrical connection portion 23 in the width direction Y is larger than a width of the core wire crimping portion 21 in the width direction Y, and each of the side walls of the core wire crimping portion 21 and each of the side walls of the electrical connection portion 23 are coupled via each of the side wall portions 24*b* and 24*c* of the coupling portion 24.

Specifically, the side wall portion 24*b* of the coupling portion 24 has a straight portion 24*ba* that extends from the core wire crimping portion 21 toward the longitudinal direction X of the crimp terminal 20 and a wide portion 24*bb* that connects between the straight portion 24*ba* and one side wall of the electrical connection portion 23. In addition, the side wall portion 24*c* of the coupling portion 24 has a straight portion 24*ca* that extends from the core wire crimping portion 21 toward the longitudinal direction X of the crimp terminal 20 and a wide portion 24*cb* that connects between the straight portion 24*ca* and the other side wall of the electrical connection portion 23. Each of the straight portions 24*ba* and 24*ca* extends in a straight line along each of the side walls of the core wire crimping portion 21. In the width direction Y of the crimp terminal 20, a distance between the wide portions 24*bb* and 24*cb* facing each other is formed so that the distance is gradually wider from the straight portions 24*ba* and 24*ca* side toward the electrical connection portion 23 side.

In other words, the coupling portion 24 includes a first part ST that extends with a constant width along the longitudinal direction X and a second part Wd that increases in the width along the longitudinal direction X from the core wire crimping portion 21 side toward the electrical connection portion 23 side. The first part ST and the second part Wd are formed in a U-shape in cross-section in the longitudinal direction X. In the coupling portion 24, the first part ST extends from the core wire crimping portion 21, and the second part Wd connects between the first part ST and the electrical connection portion 23. The straight portions 24*ba* and 24*ca* constitute the first part ST together with the bottom wall portion 24*a*, and the wide portions 24*bb* and 24*cb* constitute the second part Wd together with the bottom wall portion 24*a*. As illustrated in FIGS. 1 to 4, the coupling portion 24 retains the shape described above before and after the swage crimp.

As illustrated in FIGS. 5 and 6, the crimp terminal 20 is crimped to the electric wire 10 by the terminal-crimping device 100. As illustrated in FIG. 6, the terminal-crimping device 100 includes a first die 101, a second die 102, and a third die 103. The first die 101 is a lower die that supports the core wire crimping portion 21, the intermediate portion 25, and the covering crimping portion 22 from below. The first die 101 has a support surface that supports the crimp terminal 20. The support surface supports the core wire crimping portion 21, the intermediate portion 25, and the bottom wall portion 22*a* of the covering crimping portion 22. In a state in which the crimp terminal 20 is supported by the first die 101, the first barrel piece 21*b* and the second barrel piece 21*c* of the core wire crimping portion 21 are in a posture extending obliquely upward from the bottom wall 21*a*. In addition, in a state in which the crimp terminal 20 is supported by the first die 101, the third barrel piece 22*b* and the fourth barrel piece 22*c* of the covering crimping portion 22 are in a posture extending obliquely upward from the bottom wall portion 22*a*.

The second die 102 is an upper die that sandwiches the core wire crimping portion 21 and the core wires 10*a* with the first die 101 in therebetween to allow the core wire crimping portion 21 to be crimped to the core wires 10*a*. The second die 102 is arranged over the first die 101. The second die 102 moves relative to the first die 101 along the vertical direction.

As illustrated in FIG. 5, the second die 102 has a core wire crimping surface 122 facing the core wire crimping portion 21 in the height direction Z. Viewed from the distal end side of the core wires 10*a*, the core wire crimping surface 122 has a first curved surface 122*a* and a second curved surface 122*b* that are adjacent to each other in the width direction Y and are concave and curved toward the opposite side to the support surface side. A boundary 122*c* between the first curved surface 122*a* and the second curved surface 122*b* in the core wire crimping surface 122 is formed as a peak shape that protrudes toward the support surface. The first curved surface 122*a* and the second curved surface 122*b* are substantially symmetrical with respect to the width direction Y. The cross-sectional shapes of the first curved surface 122*a* and the second curved surface 122*b* are, for example, circular arc shapes or substantially circular arc shapes.

In the second die 102, a first wall surface 122*d* is provided on the side of the first curved surface 122*a* opposite to the second curved surface 122*b* in the width direction Y. The first wall surface 122*d* extends along the height direction Z from an end portion of the first curved surface 122*a* opposite to the second curved surface 122*b* side. A second wall surface 122*e* is provided on the side of the second curved surface 122*b* opposite to the first curved surface 122*a* side in the width direction Y. The second wall surface 122*e* extends along the height direction Z from an end portion of the second curved surface 122*b* opposite to the first curved surface 122*a* side. The first wall surface 122*d* and the second wall surface 122*e* face each other in the width direction Y. The first wall surface 122*d* and the second wall surface 122*e* are substantially symmetrical with respect to the width direction Y. In the height direction Z, the first wall surface 122*d* is arranged over the first barrel piece 21*b*, and the second wall surface 122*e* is arranged over the second barrel piece 21*c*.

As illustrated in FIG. 6, the third die 103 is provided as another upper die separated from the second die 102. The third die 103 has a covering crimping surface that is concave and curved toward the opposite side to the support surface side. The third die 103 has side walls extending along the height direction at both ends of the covering crimping surface in the width direction Y. The third die 103 moves relative to the first die 101 along the vertical direction (height direction Z).

The terminal-crimping device 100 has a drive unit 110 that moves the second die 102 and the third die 103 upward and downward. In the embodiment, the drive unit 110 lowers the second die 102 and third die 103 toward the first die 101 with the crimp terminal 20 and the electric wire 10 supported by the first die 101. The core wires 10*a* of the electric wire 10 are installed in a space surrounded by the bottom wall 21*a*, the first barrel piece 21*b*, and the second barrel piece 21*c* of the core wire crimping portion 21, and are placed on the inner surface of the bottom wall 21*a*. As the second die 102 descends toward the first die 101, the core wire crimping surface 122 comes into contact with the first barrel piece 21*b* and the second barrel piece 21*c*. Specifically, the first barrel piece 21*b* comes into contact with the first wall surface 122*d*, and the second barrel piece 21*c* comes into contact with the second wall surface 122*e*. The first wall surface 122*d* presses the first barrel piece 21*b* toward the second wall surface 122*e* to change the inclination of the first barrel piece 21*b* toward the second wall surface 122*e* side. The second wall surface 122*e* presses the second barrel piece 21*c* toward the first wall surface 122*d* to change the inclination of the second barrel piece 21*c* toward the first wall surface 122*d* side.

In a case in which the second die 102 further descends, a distal end of the first barrel piece 21*b* comes into contact with the first curved surface 122*a*, and a distal end of the second barrel piece 21*c* comes into contact with the second curved surface 122*b*. A distal end portion of the first barrel piece 21*b* is bent toward the core wires 10*a* by the first curved surface 122*a*, and a distal end portion of the second barrel piece 21*c* is bent toward the core wires 10*a* by the second curved surface 122*b*. The core wire crimping portion 21 is then crimped to the core wires 10*a* by the swage, so-called B crimp.

In addition, the terminal-crimping device 100 sandwiches the covering crimping portion 22 and the covering portion 10*b* of the electric wire 10 between the covering crimping surface and the support surface of the third die 103, and allows the covering crimping portion 22 to be crimped to the covering portion 10*b*. Specifically, the covering crimping surface of the third die 103 comes into contact with the third barrel piece 22*b* and the fourth barrel piece 22*c* of the covering crimping portion 22, brings the third barrel piece 22*b* and the fourth barrel piece 22*c* close to each other, and bends the third barrel piece 22*b* and the fourth barrel piece 22*c* so that one barrel piece overlaps the other barrel piece to crimp the covering crimping portion 22 to the covering portion 10*b*. In this way, the terminal-crimping device 100 crimps the covering crimping portion 22 to the covering portion 10*b*.

The second die 102 is extended from the third die 103 side toward the electrical connection portion 23 side in order not to form a bell-mouth at the first end portion 21*d* of the core wire crimping portion 21 (or to make the bell-mouth formed at the first end portion 21*d* smaller). With this configuration, the core wire crimping surface 122 of the second die 102 presses the first end portion 21*d* of the core wire crimping portion 21. Thus, no bell-mouth is formed at the first end portion 21*d* (or the bell-mouth formed at the first end portion 21*d* is smaller than the bell mouth formed at the second end portion BM).

An area RA illustrated in FIG. 7 represents a position of the side walls of the second die 102 (a part of the second die constituting the first wall surface 122*d* and the second wall surface 122*e*). An area RB illustrated in FIG. 7 represents a position of the side walls of the third die 103. As described above, in the embodiment, the second die 102 is extended from the third die 103 side toward the electrical connection portion 23 side.

In the crimp terminal 20 of the embodiment, the first part ST (extending with a constant width along the longitudinal direction X) and the core wire crimping portion 21 are arranged at the position corresponding to the area RA (between the first wall surface 122*d* and the second wall surface 122*e*). The width of the first part ST in the width direction Y is set to be substantially equal to the width of the core wire crimping portion 21 in the width direction Y after the swage crimping. Therefore, the first part ST and the area RA do not overlap with each other when viewed from the height direction Z. Therefore, the interference between the coupling portion 24 and the second die 102 is prevented. In the embodiment, the length of the first part ST in the longitudinal direction X is set to a length sufficient to prevent the interference with the second die 102.

As described above, the crimp terminal 20 according to the present embodiment is provided with the core wire crimping portion 21 that is crimped to the core wires 10*a* exposed from the end of the covering portion 10*b* of the electric wire 10; the electrical connection portion 23 that is able to be connected to the mating-side member; and the coupling portion 24 that is provided between the core wire crimping portion 21 and the electrical connection portion 23, in which the coupling portion 24 includes the bottom wall portion 24*a* and the side wall portions 24*b* and 24*c* that are provided to stand at both ends of the bottom wall portion 24*a* respectively in the width direction Y orthogonal to the longitudinal direction X from the core wire crimping portion 21 toward the electrical connection portion 23, each of the side wall portions 24*b* and 24*c* has each of the straight portions 24*ba* and 24*ca* that extends from the core wire crimping portion 21 along the longitudinal direction X and each of the wide portions 24*bb* and 24*cb* that connects between the straight portions 24*ba* and 24*ca* and the electrical connection portion 23, the core wire crimping portion 21 includes the bottom wall 21*a* and the side walls 21*b* and 21*c* that are provided to stand at both ends of the bottom wall 21*a* respectively in the width direction Y, each of the straight portions 24*ba* and 24*ca* extends in a straight line along each of the side walls 21*b* and 21*c* of the core wire crimping portion 21, and in the width direction Y, the distance between the wide portions 24*bb* and 24*cb* facing each other is formed so that the distance is gradually wider from the straight portion 24*ba* and 24*ca* side toward the electrical connection portion 23 side.

The crimp terminal 20 according to the embodiment is provided with the straight portions 24*ba* and 24*ca*. In the crimp terminal 20 according to the embodiment, this configuration enables the second die 102 to press the first end portion 21*d* of the core wire crimping portion 21 while preventing the interference of the second die 102 of the terminal-crimping device 100 with the coupling portion 24 during the swage crimping to the electric wire 10. Therefore, the crimp terminal 20 according to the embodiment has the effect that the variation of the terminal shape can be prevented while the height of the terminal at the first end portion 21*d* (front end) of the core wire crimping portion 21 is prevented from increasing during the swage crimping to the electric wire 10. The crimp terminal 20 according to the embodiment can also prevent the shape variation in the coupling portion 24 by preventing the interference of the second die 102 with the coupling portion 24. In addition, the crimp terminal 20 according to the embodiment can also prevent the decrease in strength of the coupling portion 24 by preventing the interference of the second die 102 with the coupling portion 24.

In addition, the terminal-fitted electric wire 1 according to the embodiment is provided with the electric wire 10 that is formed of the conductive core wires 10*a* covered by the insulative covering portion 10*b*; and the crimp terminal 20 that includes the core wire crimping portion 21 wrapping and crimping the entire circumference of the core wires 10*a* exposed from the end of the covering portion 10*b*, the electrical connection portion 23 provided on the opposite side to the covering portion 10*b* side with respect to the core wire crimping portion 21 and connected to the mating-side member, and the coupling portion 24 provided between the core wire crimping portion 21 and the electrical connection portion 23, in which the height of the terminal at the first end portion 21*d* on the coupling portion 24 side in the core wire crimping portion 21 is lower than the height of the terminal at the second end portion BM on the covering portion 10*b* side in the core wire crimping portion 21, the coupling portion 24 includes the bottom wall portion 24*a* and the side wall portions 24*b* and 24*c* that are provided to stand at both ends of the bottom wall portion 24*a* respectively in the width direction Y of the crimp terminal 20, each of the side wall portions 24*b* and 24*c* has each of the straight portions 24*ba* and 24*ca* that extends from the core wire crimping portion 21 toward the longitudinal direction X of the crimp terminal 20 and each of the wide portions 24*bb* and 24*cb* that connects between the straight portions 24*ba* and 24*ca* and the electrical connection portion 23, each of the straight portions 24*ba* and 24*ca* extends in a straight line along each of the side walls of the core wire crimping portion 21, and in the width direction Y of the crimp terminal 20, the distance between the wide portions 24*bb* and 24*cb* facing each other is formed so that the distance is gradually wider from the straight portion 24*ba* and 24*ca* side toward the electrical connection portion 23 side.

The terminal-fitted electric wire 1 according to the embodiment is provided with the straight portions 24*ba* and 24*ca* in the crimp terminal 20. In the terminal-fitted electric wire 1 according to the embodiment, this configuration enables the second die 102 to press the first end portion 21*d* of the core wire crimping portion 21 while preventing the interference of the second die 102 of the terminal-crimping device 100 with the coupling portion 24 during the swage crimping. Therefore, the terminal-fitted electric wire 1 according to the embodiment has the effect that the variation of the terminal shape can be prevented while the height of the terminal at the first end portion 21*d* (front end) of the core wire crimping portion 21 is prevented from increasing when the crimp terminal 20 is swage-crimped. The terminal-fitted electric wire 1 according to the embodiment can also prevent the variation in the terminal shape of the coupling portion 24 by preventing the interference of the second die 102 with the coupling portion 24. In addition, the terminal-fitted electric wire 1 according to the embodiment can also prevent the decrease in strength of the coupling portion 24 by preventing the interference of the second die 102 with the coupling portion 24.

Reference Example

It is considered to employ a configuration in which the straight portions 24*ba* and 24*ca* are not provided in the coupling portion 24, and the coupling portion 24 serves as the bottom wall portion 24*a* and the wide portions 24*bb* and 24*cb* (that is, the coupling portion 24 constitutes only the second part Wd). In this case, a part of the second die 102 extended to press the first end portion 21*d* and the coupling portion 24 may interfere with each other, resulting in the variation in the terminal shape after crimping.

In the embodiment described above, an example in which the covering crimping portion 22 is crimped to the covering portion 10*b* by the so-called overlap crimp is exemplified, but the embodiment is not limited thereto. For example, the covering crimping portion 22 may be crimped to the covering portion 10*b* by the so-called B crimp.

The contents disclosed in the above embodiment may be combined and implemented as appropriate.

The crimp terminal and the terminal-fitted electric wire according to the present embodiment has the effect that the variation of the terminal shape can be prevented while the height of the terminal at the front end of the core wire crimping portion is prevented from increasing during the terminal crimping.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A crimp terminal comprising:

a core wire crimping portion that is configured to be crimped to a core wire exposed from an end of a covering portion of an electric wire;

an electrical connection portion that is able to be connected to a mating-side member; and a coupling portion that is provided between the core wire crimping portion and the electrical connection portion, wherein the coupling portion includes a bottom wall portion and side wall portions that are provided to stand at both ends of the bottom wall portion respectively in a width direction orthogonal to a longitudinal direction from the core wire crimping portion toward the electrical connection portion, each of the side wall portions has a straight portion that extends from the core wire crimping portion along the longitudinal direction and a wide portion that connects between the straight portion and the electrical connection portion, the core wire crimping portion includes a bottom wall and side walls that are provided to stand at both ends of the bottom wall respectively in the width direction, each of the straight portions extends in a straight line along each of the side walls of the core wire crimping portion, in the width direction, a distance between the wide portions facing each other is formed so that the distance is gradually wider from a straight portion side toward an electrical connection portion side, and each of the side wall portions includes an upper edge that extends from and is connected to each of the core wire crimping portion and the electrical connection portion, the upper edge at the electrical connection portion is spaced away from the bottom wall portion of the coupling portion in a direction that intersects each of the longitudinal direction and the width direction.

2. An electric wire assembly comprising:

an electric wire that is formed of a conductive core wire covered by an insulative covering portion, an end portion of the core wire is exposed from an end of the insulative covering portion; and a crimp terminal that includes a core wire crimping portion crimped onto the end portion of the core wire, an electrical connection portion provided on an opposite side to a covering portion side with respect to the core wire crimping portion and configured to be connected to a mating-side member, and a coupling portion provided between the core wire crimping portion and the electrical connection portion, wherein when the crimp terminal is crimped onto the end portion of the core wire, a height of the crimp terminal at a first end portion on a coupling portion side in the core wire crimping portion is lower than a height of the crimp terminal at a second end portion on the covering portion side in the core wire crimping portion, the coupling portion includes a bottom wall portion and side wall portions that are provided to stand at both ends of the bottom wall portion respectively in a width direction of the crimp terminal, each of the side wall portions has a straight portion that extends from the core wire crimping portion toward the longitudinal direction of the crimp terminal and a wide portion that connects between the straight portion and the electrical connection portion, each of the straight portions extends in a straight line along each of side walls of the core wire crimping portion, and in the width direction of the crimp terminal, a distance between the wide portions facing each other is formed so that the distance is gradually wider from a straight portion side toward an electrical connection portion side, and each of the side wall portions includes an upper edge that extends from and is connected to each of the core wire crimping portion and the electrical connection portion, the upper edge at the electrical connection portion is spaced away from the bottom wall portion of the coupling portion in a direction that intersects each of the longitudinal direction and the width direction.

* * * * *